UNITED STATES PATENT OFFICE.

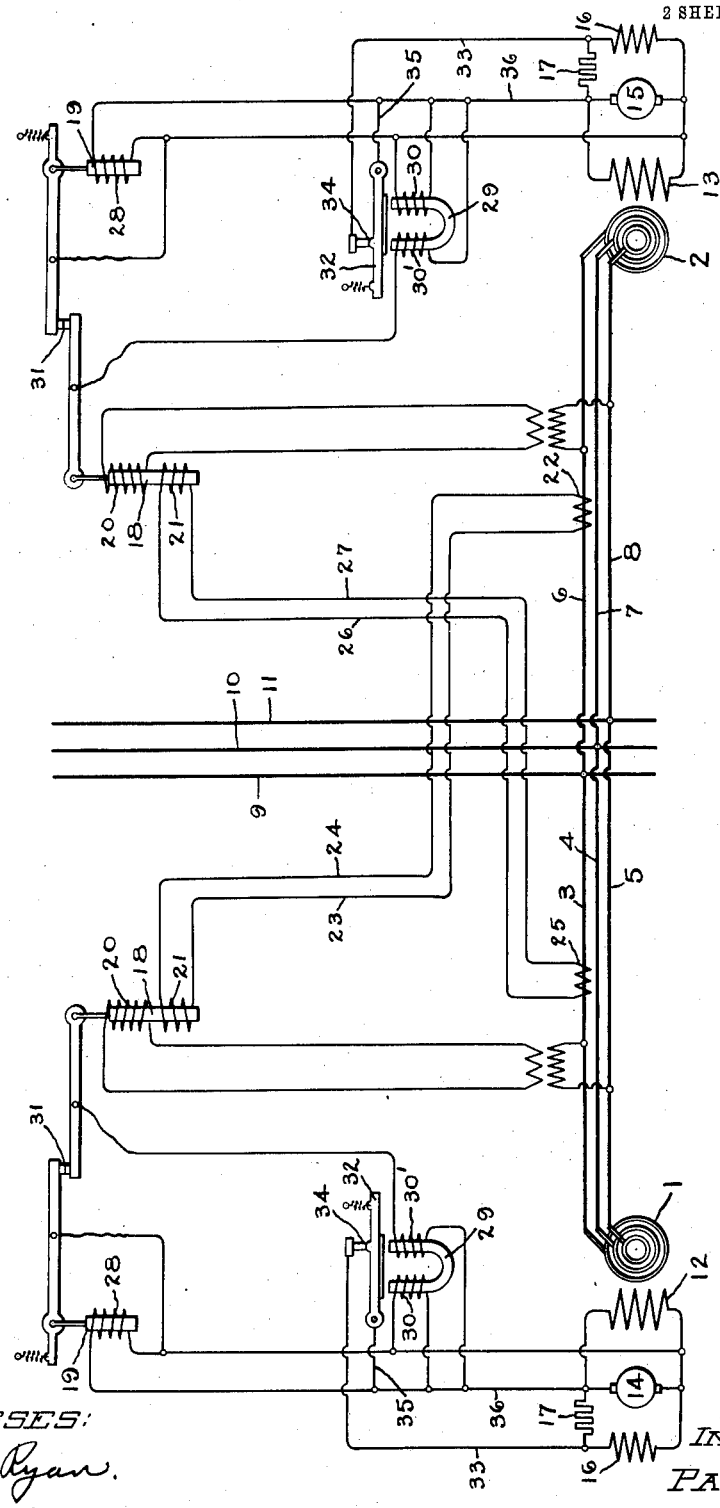

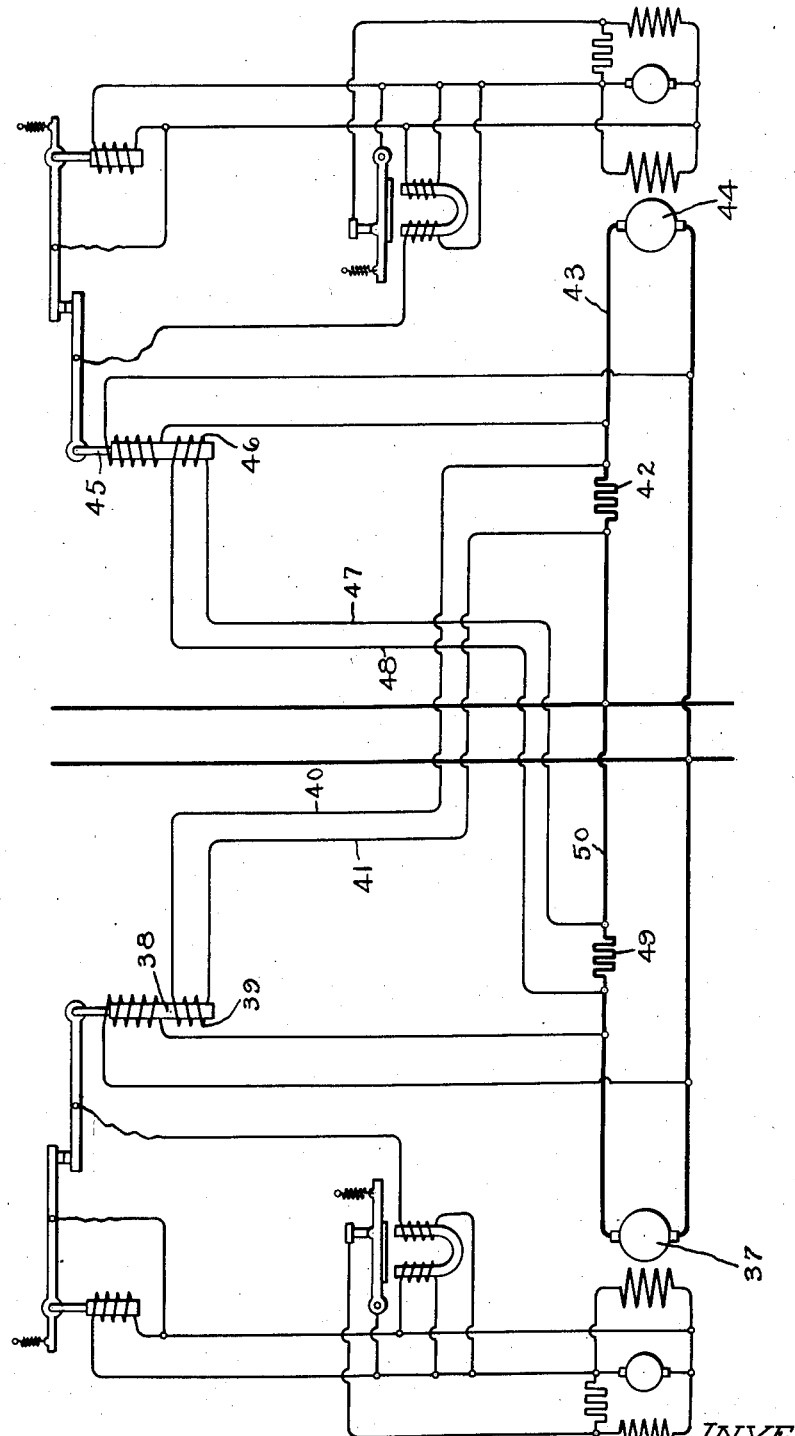

PAUL ROSE, OF BERLIN, GERMANY, ASSIGNOR TO GENERAL ELECTRIC COMPANY, A CORPORATION OF NEW YORK.

SYSTEM OF DISTRIBUTION.

No. 928,219.  Specification of Letters Patent.  Patented July 13, 1909.

Application filed January 28, 1909. Serial No. 474,823.

*To all whom it may concern:*

Be it known that I, PAUL ROSE, a subject of the King of Prussia, residing at Berlin, Germany, have invented certain new and useful Improvements in Systems of Distribution, of which the following is a specification.

The present invention relates to a system for the automatic distribution of the load on two alternating-current, or direct-current, separately-excited, generators operating in parallel, the excitation of each of which is controlled by an automatic potential regulator, so that by the regulation of the potential of the exciting current the generator potential is maintained at a value that is constant for a given load, and rises with an increase of load. This method of regulation is desirable in those cases, for example, where the potential is to be kept constant at a distant point, and wherein, by reason of the voltage loss in the conductor, the central-station voltage must be increased with increase in load. If in such case the load is to be distributed between the generators in a certain ratio, care must be taken that the potential of the exciting current of the two generators are simultaneously raised or reduced in the same proportion, in order that the ratio may remain unchanged. In order that this requirement be met we must assume, however, that the exciting generators have not only the same electrical characteristics; but that the two potential regulators possess the same sensitiveness and the same speed of regulation: conditions which are practically unattainable because of the unavoidable inequalities in the magnetic properties of the exciting machines and the mechanical properties of the regulators.

It is the aim of the present invention to bring about at all times a constant distribution of load by making the regulator of each machine sensitive to changes of current in the armature leads of the other machine.

When a regulator is intended to regulate for a potential that is constant for a given load and increases with the load, the regulating member is influenced by two forces, one of which is proportional to the potential of the distribution system, and the other to the current in the distribution system. For this purpose the magnet coil which actuates the regulating member is furnished with two windings, namely, a potential winding and a so-called "compensating" current winding. The regulator becomes active when the ampere turns of the actuating coil exceed or drop below a certain predetermined value, at which it is in equilibrium, and it increases or decreases the exciter potential until this value is again attained. When running idle, that is, as long as the current winding of the actuating coil is without current, the regulator is in equilibrium only at a positively predetermined potential in the distribution system. At load the current winding opposes the potential winding, and with an increase in current causes the regulator to maintain an increasingly higher potential on the system.

As heretofore indicated, in accordance with the present invention the current coil of each regulator is traversed not by current from its own generator, but with current which is proportionate to the current of the generator which is operating in parallel with it. When the desired load ratio is not maintained the current of the too highly loaded generator acts on the regulator of the one being too lightly loaded, so as to bring about an increase of the exciter potential on the latter until the correct distribution of the load is again restored.

The accompanying drawings are diagrams, of which Figure 1 illustrates my invention in connection with separately-excited, alternating-current, generators, and Fig. 2 in connection with separately-excited, direct-current generators.

Corresponding parts are indicated by the same reference numerals.

Referring to Fig. 1, the alternating-current generators 1, 2 are connected by means of conductors 3, 4, 5, 6, 7, 8 to the mains 9, 10, 11. These generators have been shown, in this case, for illustration, as three-phase generators; but, of course, the present invention is not limited to generators of any particular number of phases. The generators are provided with separately-excited fields 12, 13 energized by exciters 14, 15, respectively. These exciters have each a shunt field 16 in series with which are resistances 17.

The regulators shown in connection with this invention are of the well-known Tirrill, type, and as the operation of this form of regulator is well-known, a brief description of its construction and operation will suffice. Each regulator comprises two main control magnets 18, 19, of which magnet 18 is under the influence of the voltage and current in the main circuit, and the magnet 19 under the influence of the voltage in the exciting circuit. The main control magnet 18 of each regulator is provided with a voltage winding 20, which is connected in this case to the secondary of a potential transformer, but which may be connected across the lines. It is also provided with a current winding 21. The winding 21 of the regulator for generator 1 is traversed by current from the current transformer 22, the primary of which is in series with the armature lead 6 of the other generator 2 being connected to the secondary of the transformer 22 by means of conductors 23, 24. Conversely, the current winding 21 on the main control magnet of the regulator for generator 2 is fed through conductors 26, 27 by current obtained from the current transformer 25, the primary of which is in the armature lead 3 of generator 1. The magnet 19 of each of the regulators is provided with a potential winding 28 connected across the exciter mains of their respective exciters. Each regulator is also provided with a relay magnet 29, which is differentially wound, the winding 30 being connected permanently across the exciter mains as plainly shown, and the winding 30' across these same conductors through the main contacts 31 of the regulator. The release of the armature 32 of the relay magnet completes a shunt circuit around the resistance 17 in the field of each exciter through conductors 33, relay contacts 34, and conductors 35, 36.

Fig. 2 illustrates my invention as applied to separately-excited, direct-current generators connected in parallel. The transition from an alternating-current to a direct-current system entails certain changes. Instead of employing current transformers in the armature leads of the generators, resistances are employed, across which the current coils are connected, as will be explained. The regulator of generator 37 has its main control magnet 38 provided with a current coil 39 connected by means of conductors 40, 41 across resistance 42 in series with the armature lead 43 of the generator 44. The main control magnet 45 of the generator 44 is provided with a current winding 46 connected by means of conductors 47, 48 across the resistance 49 in series with the armature lead 50 of the generator 37. The potential windings of magnets 38, 45 are connected directly across the armature leads of the respective generators. In other respects the direct-current system is similar to the alternating-current system illustrated in Fig. 1.

The method of operation of this regulating system is as follows: If the potential in the armature leads of either generator tends to fall, the main contacts 31 of the regulators will close, thereby completing the circuit through the differential windings 30' of the relay magnets 29, and thereby deënergizing this magnet. The effect of this is to close contacts 34, and thereby short-circuit the resistances 17 in the fields of the exciters. This raises the exciter voltages, and thereby in turn raises the generator voltages. The resistance in the exciter field is chosen of sufficiently great value so that the generator voltage is raised above the normal, causing the main contacts to open and the relay contacts in turn and thus again insert the resistance in the field of the exciter. This operation takes place at a high rate of speed, and the effect of it is to tend to maintain the voltage of the generator constant. With an increase of load the current windings of the regulator will tend to oppose the potential windings, and thereby maintain the voltage at a somewhat higher point corresponding to the increase of load.

We will assume that the potential regulators of both generators are the same in respect to method of construction and proportions, and that the number of turns and the resistances of the actuating circuits are of equal magnitude in both regulators. As the generators are operating in parallel the potential at the terminals of the potential winding of each regulator is always of the same magnitude. The current intensities in the current windings must also be in accord with the predetermined distribution of load between the two generators. If, however, one generator tends to take more than its share of the load, the current traversing the current winding of the regulator for the other generator will increase, thereby raising the voltage of this second generator and restoring the desired division of load. For example, if the generator 2 were taking more than its share of the load the current in winding 21 of the regulator for generator 1 would be increased, thereby closing main contacts 31 for a somewhat longer interval of time, and this in turn would cause contacts 34 to remain closed for a somewhat longer interval of time. The resistance 17 in the field circuit of the exciter 14 would, therefore, be short circuited for a somewhat longer interval of time, and the effect of this would be to raise the voltage of the current energizing the field 12 of the generator 1. The voltage of generator 1 would, therefore, rise until it was furnishing its share of the current. If an equal division of load is not desired the current windings of the regulators are proportioned in accordance with the division of load desired. Exactly the same thing would be true of the direct-current system shown in Fig. 2. For example, if generator 44 were furnishing more than its share of the load the increase of current in the armature lead 43 would bring about a greater drop of potential across the resistance 42, and this would increase the current in the current winding 39 of the regulator for generator 37, and in the same manner as explained in connection with Fig. 1, raise the voltage of the generator 37 and cause it to furnish its proper share of the load.

By means of resistances, or reactance coils, or condensers connected in circuit with the current windings or potential windings of the regulators, a predetermined distribution of the watt load or the wattless load of the generators may be established and maintained.

What I claim as new and desire to secure by Letters Patent of the United States, is,

1. Means for maintaining a predetermined division of load between two separately-excited generators connected in parallel, which consists in a voltage regulator for each generator containing a main control magnet having a differential winding, one portion of which is responsive to changes of voltage in the line of its own generator and the other to changes of current in the other generator.

2. The combination of two separately-excited generators connected in parallel, a voltage regulator for each machine comprising a differentially wound magnet, the current in one winding of which varies with the voltage of its own generator and the current in the opposing coil varies with the load of the other generator.

3. The combination of two alternating-current generators connected in parallel, a voltage transformer for each machine having its primary connected across the armature circuit, a current transformer for each machine having its primary in series with the armature circuit, and a voltage regulator for each machine, comprising a differentially-wound magnet, one of whose windings is connected to the secondary of the potential transformer of its own generator, and the opposing winding is connected to the secondary of the current transformer of the other generator.

In witness whereof, I have hereunto set my hand this seventh day of January, 1909.

PAUL ROSE.

Witnesses:
    JULIUS RŮMLAND,
    KARL G. RICKEBEN.